F. L. MOORE.
COUPLING FOR AUTOMOBILE RADIATORS AND THE LIKE.
APPLICATION FILED MAR. 31, 1920.
1,360,005.
Patented Nov. 23, 1920.
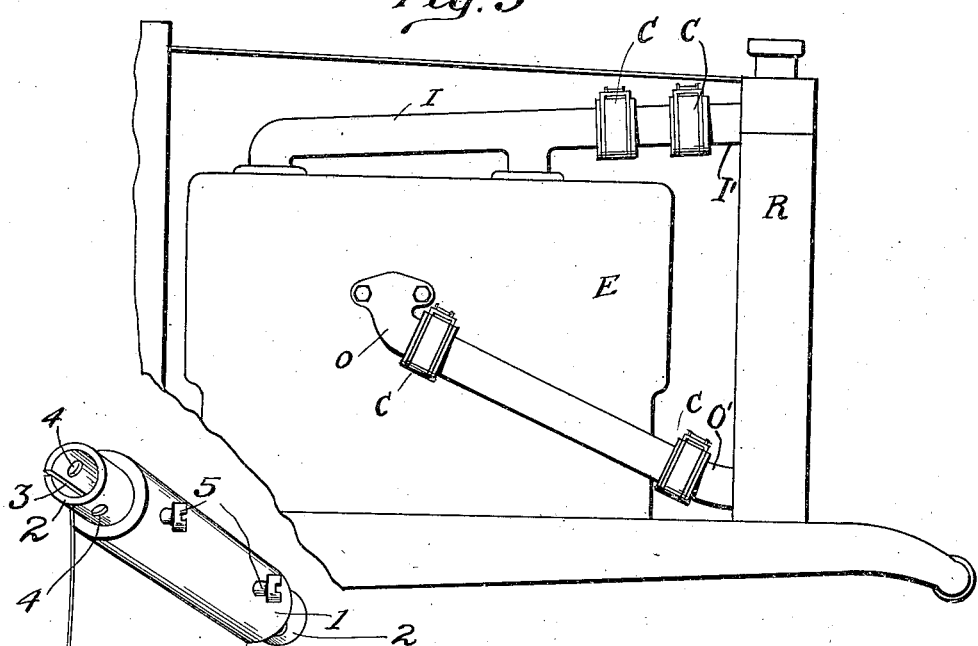
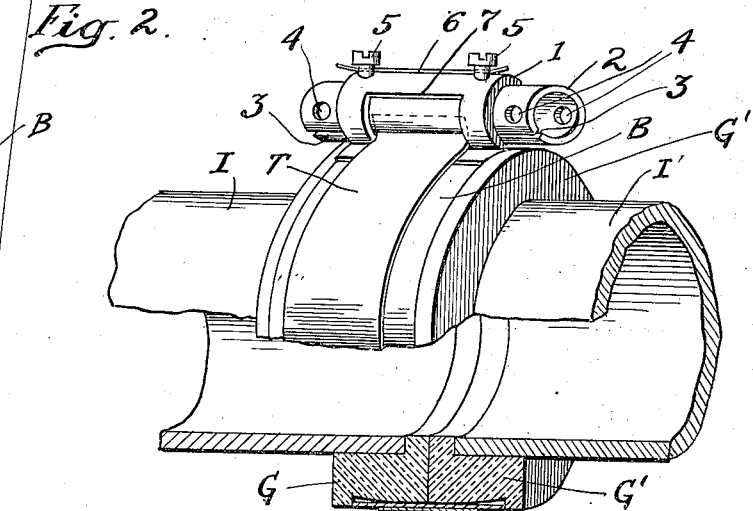

UNITED STATES PATENT OFFICE.

FRANK L. MOORE, OF TRUMANSBURG, NEW YORK.

COUPLING FOR AUTOMOBILE-RADIATORS AND THE LIKE.

1,360,005.   Specification of Letters Patent.   Patented Nov. 23, 1920.

Application filed March 31, 1920. Serial No. 370,241.

*To all whom it may concern:*

Be it known that I, FRANK L. MOORE, a citizen of the United States, residing at Trumansburg, in the county of Tompkins, State of New York, have invented certain new and useful Improvements in Couplings for Automobile-Radiators and the like, of which the following is a specification, reference being had therein to the accompanying drawing.

My invention relates to couplings for water pipes and the like, with particular reference to the couplings used on the water jacket connections of automobile engines.

In all water-cooled gas engines employing radiators the intake and discharge pipes of the radiator are connected to discharge and intake pipes respectively of the water jacket of the engine, a pump being interposed to maintain a circulation. The maintenance of tight joints or couplings between the water jacket and the radiator terminals is not as simple in automobile engines as it would be with stationary pieces of apparatus and the time consumed in making repairs and putting in new couplings becomes of importance because of the loss of efficiency in any traveling unit caused by stoppage.

A common method of making such connections is by using short section of rubber and canvas hose wired or otherwise secured at both ends to short lengths of pipe protruding from the engine jacket and the radiator respectively. While it is a comparatively easy matter to remove such an old and worn out radiator hose, or one which has become defective, by loosening the clamps or wires and cutting the hose lengthwise with a knife, to replace it with a new one is sometimes a more difficult problem, and in my experience in many cases it has been absolutely necessary to remove the radiator in order to replace the lowest or discharge connection therefrom. The problem is complicated by a variety of pump connections, especially if the same happen to be interposed in constricted space between the radiator and the engine.

My invention is intended to solve this problem by combining both the hose and the clamp in a single unit, which must be watertight when in place, adjustable to various diameters of hose connections, constructed in various lengths, and easily applied or removed without disturbing the radiator from its permanent position.

Briefly stated, the invention consists of two essential parts, viz., a pair of rubber rings to fit over the ends of the pipes to be coupled together, and a metal band spanning the rings and compressed upon them so as to form in itself both clamp and coupling. By making the rings of different sizes and the metal clamping strip with sufficient overlap for all sizes, these parts may be fitted to various diameters of pipe, and by reason of the resiliency of the rubber rings slight variations in standard sizes are unimportant. By making the metal strips in different widths, the length of the coupling can be altered, using the same standard rings.

My invention is illustrated in the accompanying drawings in which:—

Figure 1 is a perspective view with parts broken away to show a portion of the coupling in section;

Fig. 2 is a perspective view of the clamping strip removed; and

Fig. 3 is a fragmentary view of the engine and radiator of an automobile with my coupling applied to the water jacket connections, omitting the pump for the sake of clearness and simplicity of illustration.

Referring first to Fig. 3, E is the engine and R is the radiator. I is the discharge pipe from the engine water jacket, coupled to the intake pipe for the radiator. O is the intake pipe for the water jacket, coupled to the discharge pipe from the radiator. C, C, C, C, are couplings embodying my invention.

Referring to Fig. 1, I—I' are respectively discharge pipe from the water jacket and intake pipe for the radiator. These are metal pipes shown of such a length that their ends almost abut. In this case a short coupling is used, consisting of the two rubber rings or gaskets G—G', shaped as shown with shoulders or flanges butting against the ends of the pipes respectively, so that the joint cannot work apart. Surrounding these two rings and lying in adjoining rabbets in their circumferential surfaces, is a clamping strip shown attached in Fig. 2. Referring to that figure, B is a long metal band carrying a tongue T extending from the middle of one end, and having a tubular socket A attached to the other end. This socket tube is cut away at 7 (see Fig. 1) to receive the end of the tongue T when the band is in place in the coupling. Fitted within the socket tube is a split tube 2, long enough to protrude from the socket at both ends and provided with spanner openings 4 for turning it. The slot 3 in this tube receives the end of the tongue T, as clearly shown in Fig. 1, and the tube 2 can then be turned in the socket until the clamp is drawn tight, with all the parts in rigid connection as in Fig. 1, after which the tube 2 is locked in the socket 1 by suitable means which I have shown as set screws 5, themselves provided with a locking wire 6 to prevent their loosening under road vibration or other causes.

The joint in Fig. 1 is a short one, as the rubber rings abut; but it will be evident without additional illustration that by making the band B of greater width, the rings G—G' can be separated, and the band B engage them by its two edges only, leaving its middle portion between the rings exposed to the water and forming part of the coupling. Thus, by providing bands with their integral socket tubes and key tubes, of various widths, say from two to six inches, and by providing rubber rings G—G' of different sizes, I can quickly and easily couple together the ends of the pipes I—I', or O—O' as the case may be in widely varying types and makes of automobiles.

What I claim is:—

A coupling for water pipes and the like, particularly a coupling for automobile radiator connections comprising a pair of rings of water-proof resilient material adapted to fit over the ends of the pipes to be coupled, and shaped so as to prevent longitudinal displacement on the pipes, in combination with a combined coupling and clamping band of metal carrying a tongue extending from an intermediate portion of its length to one end, and a receiving and clamping mechanism for said tongue at the other end, so fitted and arranged that the band may be overlapped, drawn taut under a compression strain, and locked around the rubber rings.

In testimony whereof I affix my signature.

FRANK L. MOORE.

Witnesses:
LORENZO J. MOORE,
HATTIE G. MOORE.